May 20, 1952 E. W. BORROW 2,597,442
GRASS AND OTHER AGRICULTURAL GREEN CROP DRYING PLANT
Filed Oct. 17, 1949 6 Sheets-Sheet 3
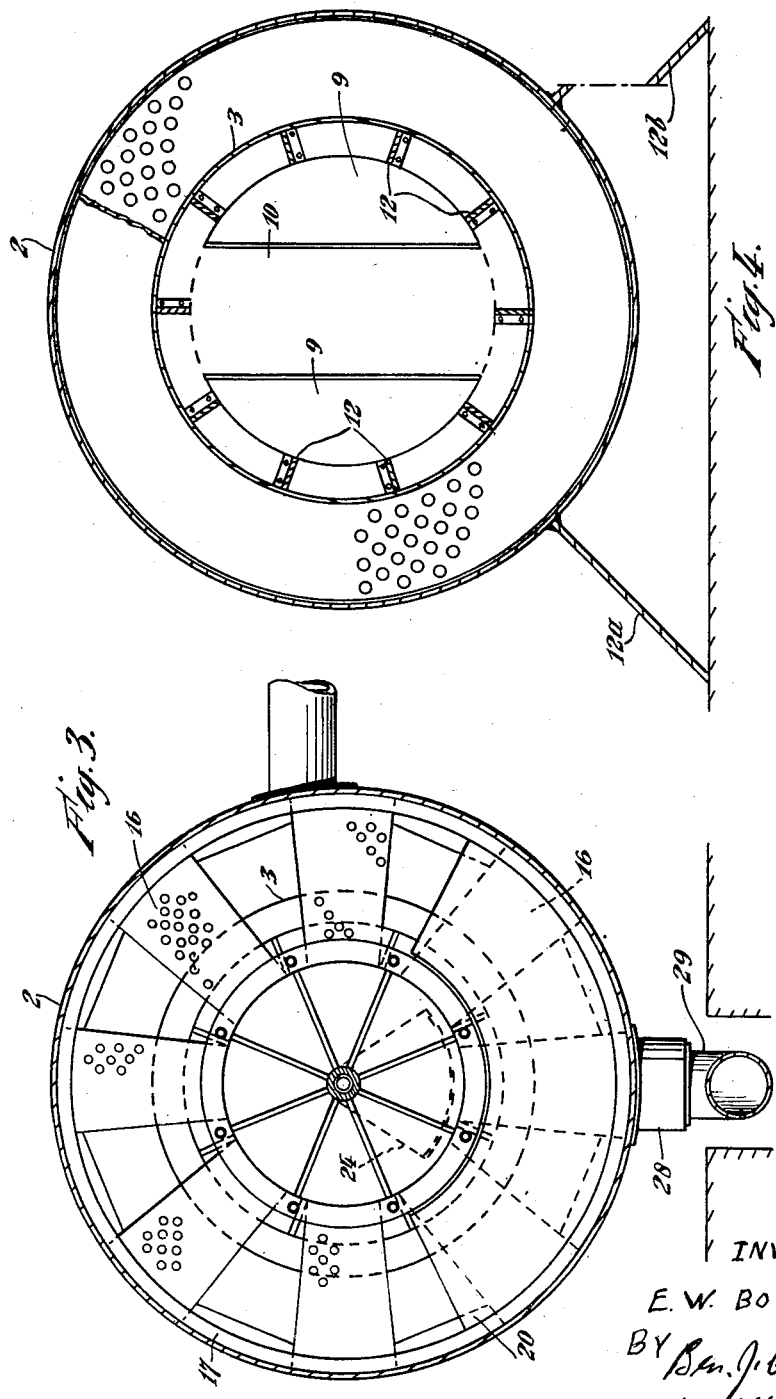
INVENTOR
E. W. BORROW May 20, 1952 E. W. BORROW 2,597,442
GRASS AND OTHER AGRICULTURAL GREEN CROP DRYING PLANT
Filed Oct. 17, 1949 6 Sheets-Sheet 4
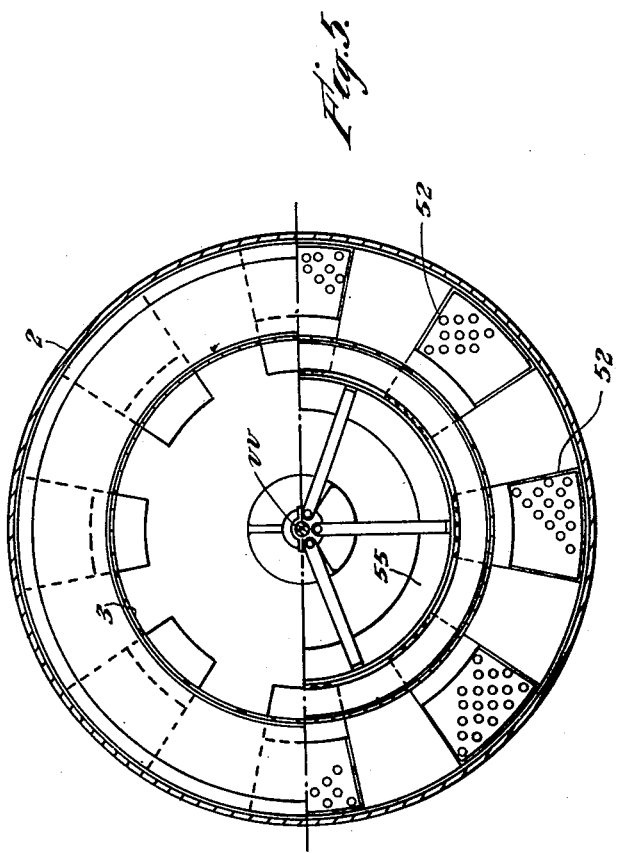
INVENTOR
E. W. BORROW May 20, 1952      E. W. BORROW      2,597,442
GRASS AND OTHER AGRICULTURAL GREEN CROP DRYING PLANT
Filed Oct. 17, 1949      6 Sheets-Sheet 5
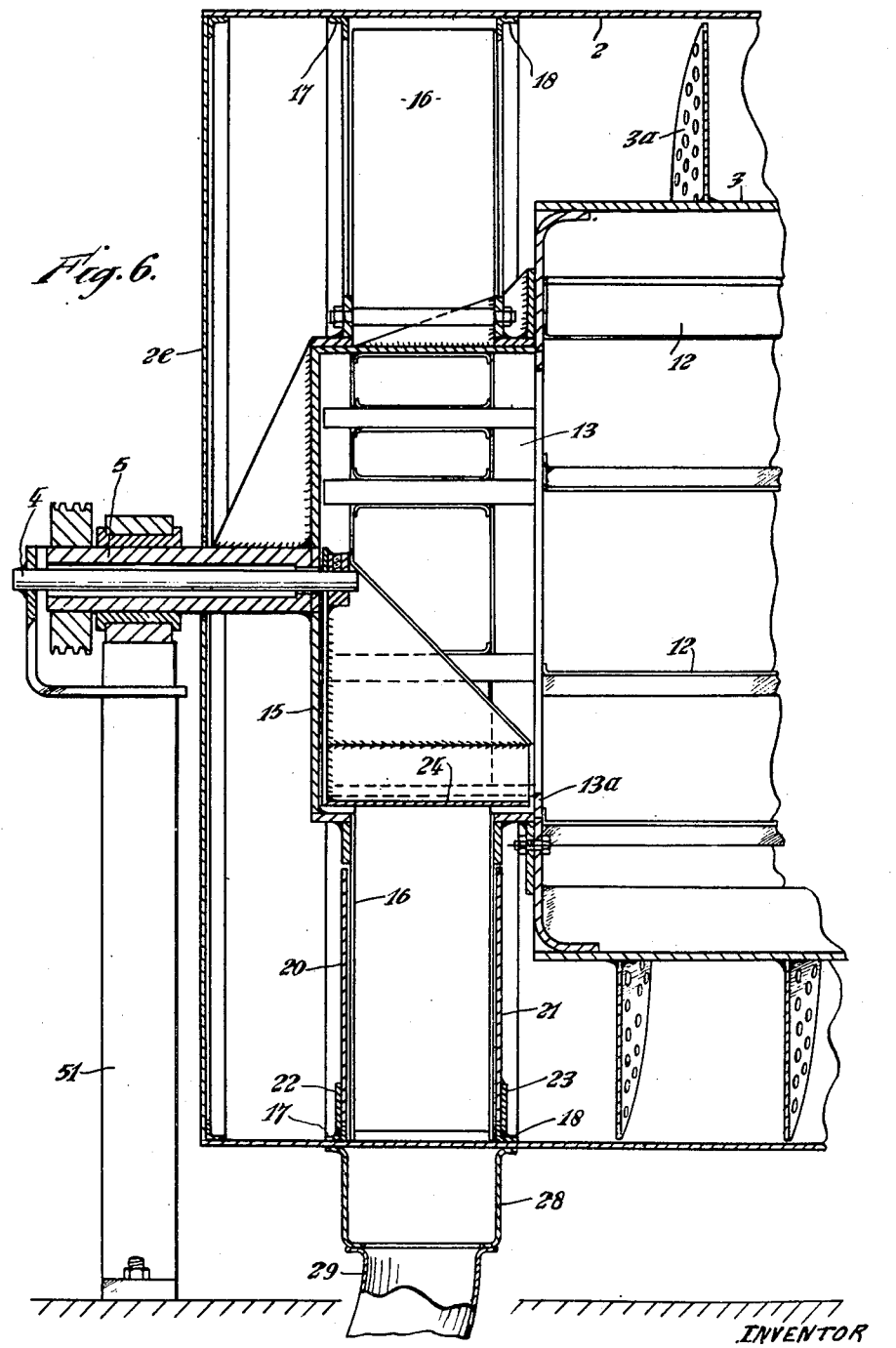

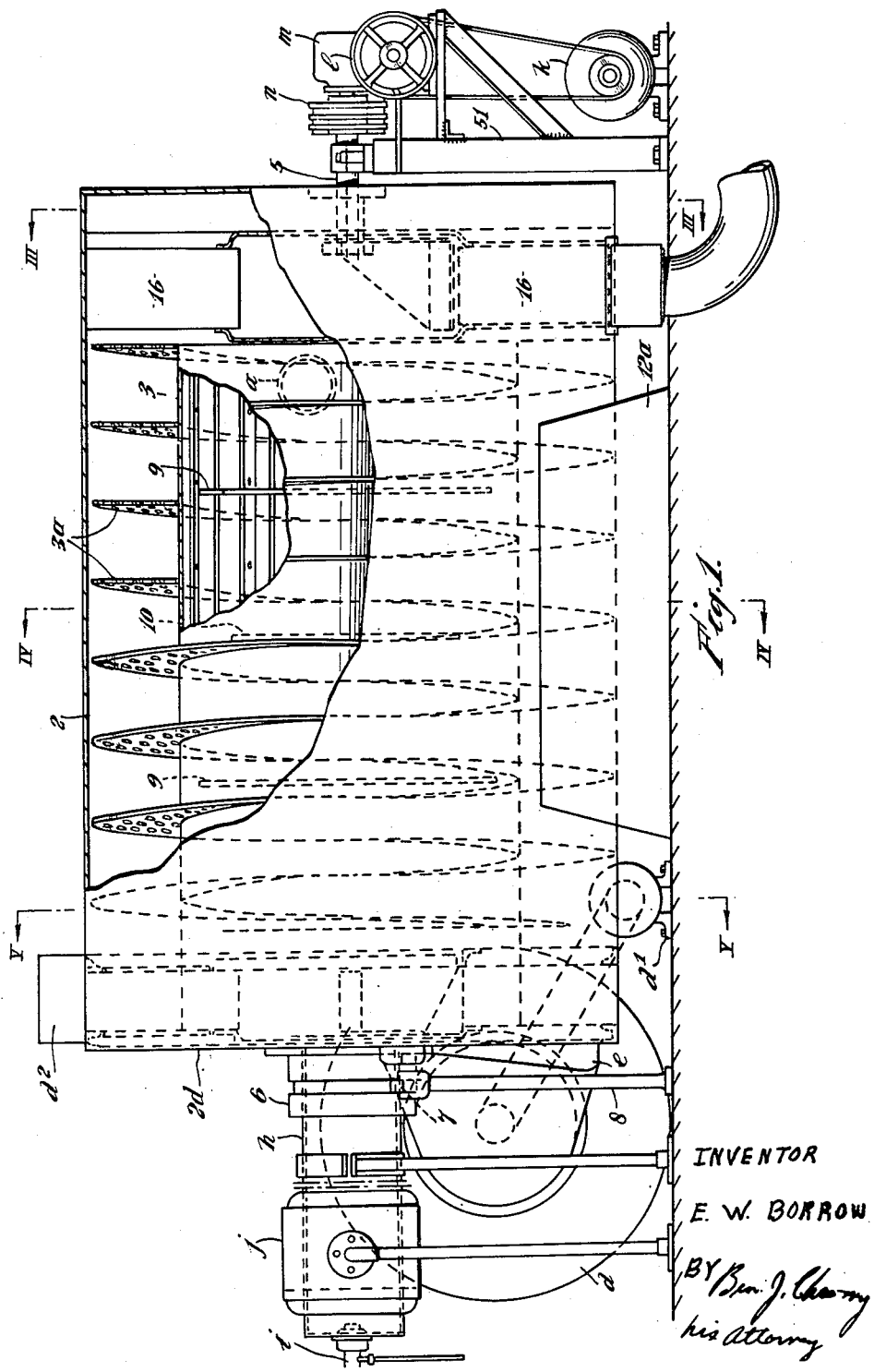

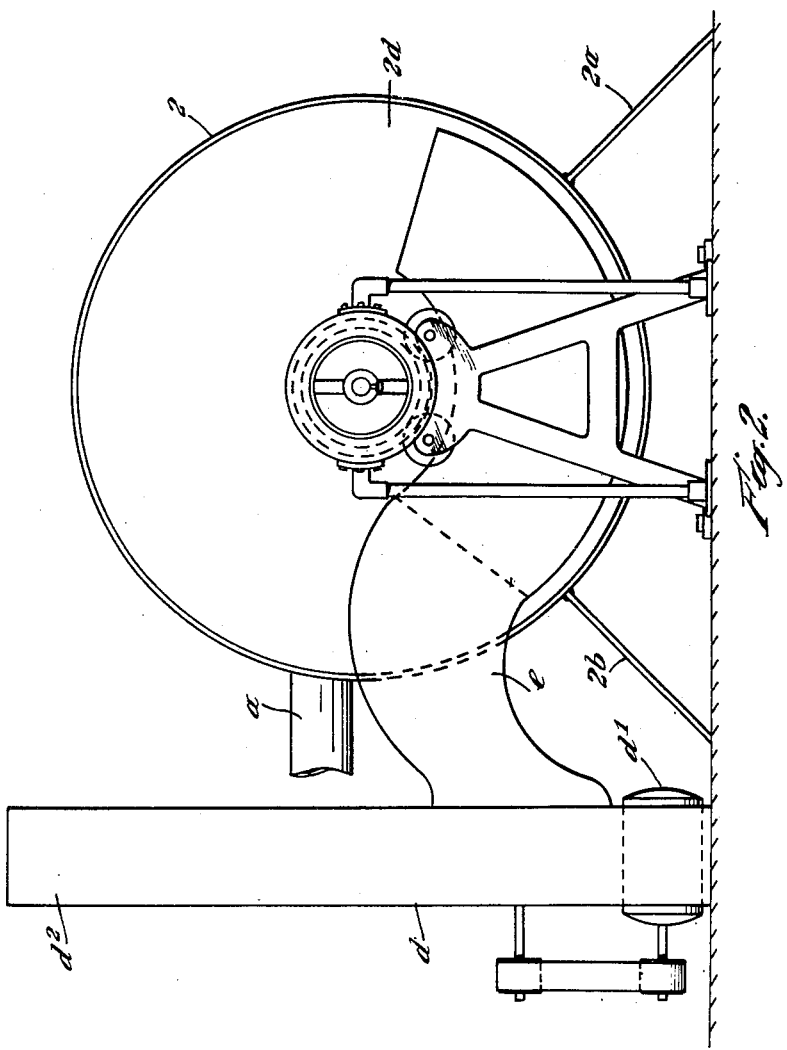

May 20, 1952     E. W. BORROW     2,597,442
GRASS AND OTHER AGRICULTURAL GREEN CROP DRYING PLANT
Filed Oct. 17, 1949     6 Sheets-Sheet 6

INVENTOR
E. W. BORROW

Patented May 20, 1952

2,597,442

UNITED STATES PATENT OFFICE 2,597,442

GRASS AND OTHER AGRICULTURAL GREEN CROP DRYING PLANT

Edgar Wilfred Borrow, Cowplain, Portsmouth, England

Application October 17, 1949, Serial No. 121,786
In Great Britain October 18, 1948

6 Claims. (Cl. 34—57)

This invention relates to apparatus for drying green cut grass and the like of the pneumatic drum type.

In the specification accompanying my prior patent application No. 88,088 I have described apparatus of the type referred to comprising a stationary external drum and an internal drum mounted therein for rotation. The mode of operation of that apparatus is, that heated air from a burner is drawn by suction first through the inner drum and then back through the space between the drums; while cut grass (or other like crop) is fed into the space between the drums, is mechanically propelled through that space by the rotation of the inner drum (becoming partially dried thereby), and is then carried back through the inner drum by the stream of freshly-heated air from the burner. The term "two-stage drum drier" when used in this specification means a drier constructed and adapted to operate in this manner.

One object of the present invention is to provide for a two-stage drum drier improved means for separating the predried grass or like crop from the predrying atmosphere. Another object of the invention is to provide improved means for collecting the dried crop.

With these objects in view the present invention provides a two-stage drum drier having a plurality of ducts or chambers so arranged that as the inner drum rotates each is first disposed in the path of the air-stream from the pre-drying stage so as to collect partially-dried crop therefrom, and then so disposed as to deliver the collected crop into the air-stream from the burner to the inner drum.

The chambers may be fixed to the inner drum and be arranged to co-operate with stationary guard means, so that crop collected by them when rotation of the inner drum brings them below its axis will be carried by them to a point above that axis and there released into a central air duct leading to the interior of the inner drum.

The apparatus may have a plurality of ducts or chambers so arranged that as the inner drum rotates each is first disposed in the air-stream from the inner to the outer stage so as to collect dried crop therefrom, and then so disposed as to deliver the collected crop to the exterior of the drier.

The ducts or chambers referred to may be fixed to the inner drum around a central chamber communicating with the interior of that drum and are arranged to co-operate with stationary guard means, so that crop will be carried into them from the central chamber during part of their travel and will be carried by them to a point below the axis of the inner drum and there released to the exterior of the drier.

In the accompanying drawings, which illustrate how the invention may be carried into effect:

Fig. 1 is a side elevation of a drying plant;

Fig. 2 is an end elevation of the plant of Fig. 1;

Fig. 3 is a sectional view of Fig. 1, taken on line III—III.

Fig. 4 is a sectional view of Fig. 1, on line IV—IV;

Fig. 5 is a sectional view of Fig. 1, on line V—V;

Fig. 6 is a partial radial view of the discharge end of the plant to an enlarged scale.

Figure 7:
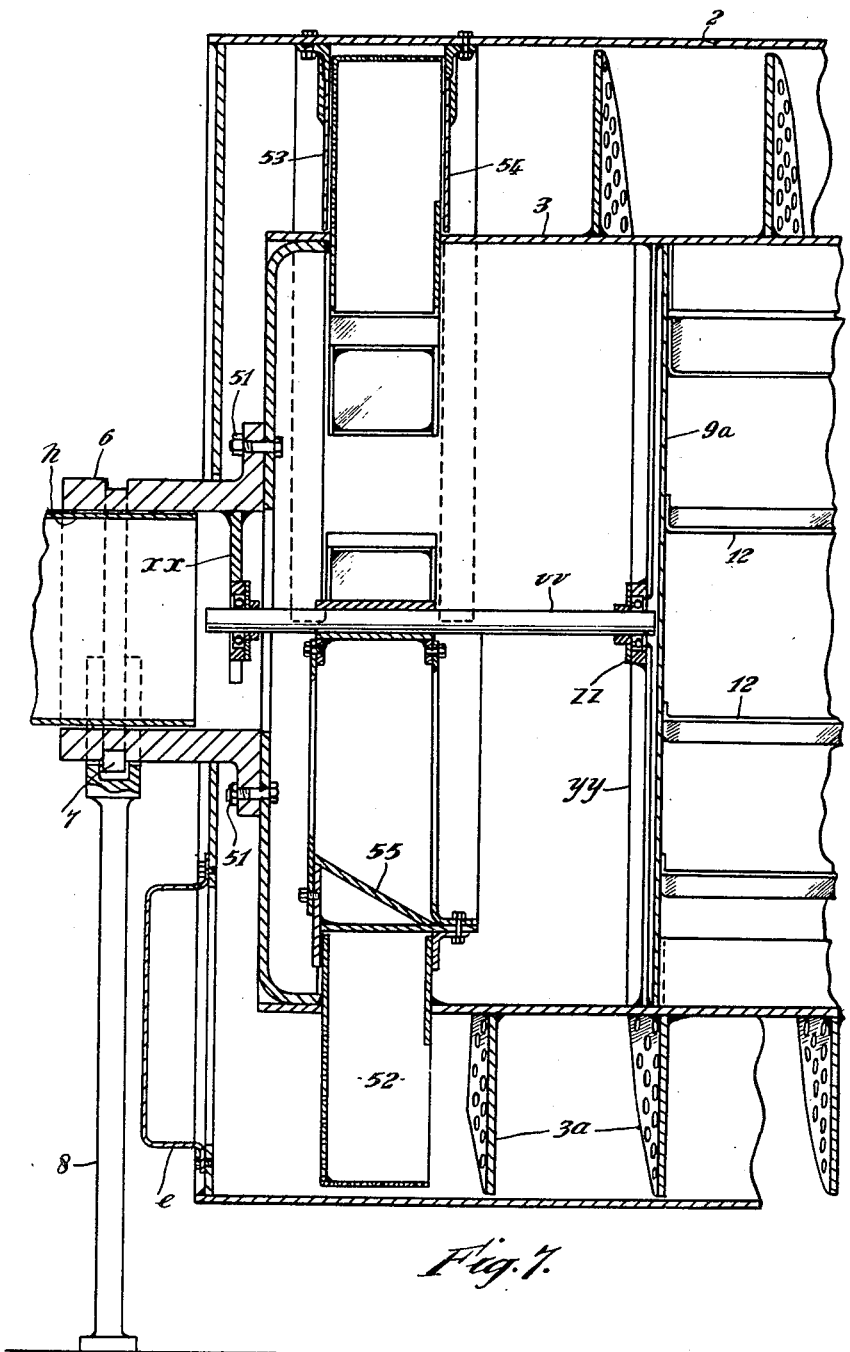
Fig. 7 is a similar view to Fig. 6 of the furnace end of the plant.

Referring now to the drawings numeral 2 denotes a stationary external drum mounted firmly on the ground by means of plate leg members 2a and 2b (Fig. 2). Drum 2 has mounted therein an internal drying drum 3 carried by a solid shaft 4, Fig. 6, rotatably mounted in a bearing shaft 5 carried by a support 5' at the discharge end of the plant and by a tubular member 6 supported by roller bearing 7 carried by a support 8 at the furnace end of the plant. Internal drum 3 is provided with perforated worm type vanes 3a mounted externally thereon so as to approach into close proximity to the interior of external drum 2.

Motive power is supplied to the drying plant by an electric motor $k$ which drives shaft 5 by belt and pulley means $l$ which drives reduction gearing $m$ by belts $n$ to shaft 5.

The drying plant is primarily intended for drying green grass which is shredded or cut by a chaff cutting machine or like implement into short lengths which are then drawn by air suction from a fan $d$ driven by electric motor $d'$ which fan is connected by duct $e$ to end plate $2d$ of stationary drum 2 (see in particular Figure 2) to produce a suction which draws the cut green grass through duct $a$ mounted at the discharge end of the plant upon stationary drum 2 into the annular space between the drums 2 and 3.

The cut or shredded grass may be green and dry, or it may be wet due to rain, dew or the like but predrying is effected during the passage of the grass between the outer drum 2 and the inner drum 3 through which space it is propelled by perforated worm 3a until it arrives at the furnace end of the plant, shown in sectional views in Figures 5 and 7.

As illustrated more particularly in Fig. 7 the inner drum 3 is secured to the tubular member 6 by means of bolts 51, the inner drum 3 being provided with a plurality of perforated radial ducts 52 into which the cut grass fed forward by vanes 3a is drawn by the air suction from fan duct e until they are shielded by guard plates 53 and 54, the ducts 52 being rotated with drum 3.

Hot air is supplied to the plant through a duct h (Figs. 1 and 7) which, as shown in Fig. 1 is provided with an oil burner i, the combustion gases from which are mixed with a predetermined amount of cooled air in a mixing chamber j, the temperature of the effluent air and combustion gas mixture being regulated so as to effect drying of the cut grass in the shortest possible time without risk of scorching or burning the predried cut grass which is fed in front of duct h when ducts 52 are shielded by guard plates 53 and 54. The tubular member 6 is provided with a spider mounted bearing xx and a similar bearing zz is also mounted just forward of baffle plate 9a on two struts yy between which is mounted a shaft vv from which is suspended by gravity guard or valve plate member 55 (see Figs. 5 and 7) which in conjunction with guard plates 53 and 54 prevents the air suction from duct e from being applied to the space within internal drum 3 at this end of the plant. The air suction created by fan d when applied through duct e to drum 2 is therefore applied only to that part of the space between drums 2 and 3 in which vanes 3a propel the cut grass from the inlet into the collector ducts or appliances 52.

The air suction is applied to the interior space in drum 3 at the discharge end through perforated ducts 16, Figures 3 and 6, and to duct h thereby causing the hot combustion gas and air mixture to pass first through the interior of the drum 3 and then secondly through the space between drums 2 and 3 in which it passes through the perforations in vanes 3a until it is finally withdrawn through duct e and discharged by means of fan d through outlet duct or chimney $d^2$.

Internal drum 3 is provided with three baffle plates 9 and 10 spaced as shown in Fig. 1. Baffle plate 10 has the sides cut off and baffle plates 9 have the centre cut out as shown in Fig. 4, these plates being secured to a plurality of longitudinal agitating ribs 12, and being arranged to deflect the predried cut grass chaff during its passage through drum 3.

From ducts 52 the predried grass, when subjected to the air suction within the space of drum 3, falls into the space within said drum in front of the hot combustion gas or air mixture duct h and is carried through into drum 3 up against baffles 9 and 10 which causes the cut grass to fall into the bottom of drum 3 where it is picked up by agitating ribs 12 which cause lifting and dropping of the cut grass with consequent agitation through its passage through drum 3.

At the discharge end of drum 3 the cut and finally dried grass is drawn by the air draught into a collecting chamber 13 formed by the assembly of members 13a, 15 and a plurality of radial ducts or open ended delivery boxes 16. The boxes 16 have perforated fore and aft walls and are disposed around the collecting chamber 13, the device thus being in the form of a wheel comprising a hollow hub and hollow radial spokes formed by the boxes.

The outer ends of the ducts are in close proximity with the peripheral wall of drum 2 to prevent leakage of air and dried grass. A pair of angle iron shielding guides 17 and 18 are secured to said wall of drum 2 as shown in Fig. 6.

The perforations in the walls of the ducts enable the air stream to escape whereas the cut grass is trapped therein (Fig. 3).

To facilitate discharge of dried grass from the ducts 16 these are wider at the outlet ends adjacent the inner periphery of drum 2 than at the inlet ends adjacent to the chamber 13, and guard or sealing plates 20 and 21 are secured to angle irons 17 and 18 by plates 22 and 23 or the like welded or otherwise secured thereto.

To further seal the ducts 16 a segmental valve or cover plate member 24 is provided as shown in Figs. 3 and 6 and is secured by set screw to shaft 4 which passes through hollow bearing shaft 5 and is secured from rotation by bracket cc.

As will be seen with reference to Fig. 3 the lower ducts 16 will be shielded or sealed against air suction from fan d during passage past parts 20, 21 and 24 and the dried grass accumulated therein will tend to fall, due to gravity, into a collecting box or hopper 28 which is connected by duct 29 with a suction fan (not shown) arranged to deposit the dried grass in a cyclone or sacking appliance or the grass may be fed to a grinding mill for grinding into meal or powder for animal feeding or the like.

As will be appreciated from the foregoing description and as described in my above mentioned prior specification the crop to be dried is fed into the annular space between the drums 2, 3 from the duct a adjacent the discharge end of the furnace and passes along this space by the mechanical action of the worm 3a and during this passage is predried partly by heat radiated from the drum 3, and partly by hot gases passing out from the discharge end of the drum 3. At the end of its passage in this direction the predried grass or the like is fed into the radial ducts 52 which are below the centre line and which are progressively rotated upwards into a position between the guard plates 53, and 54. The perforated walls of the ducts 52 permit the moisture laden air to escape via the fan d to atmosphere and the predried crop drops in front of the duct h as above described and is carried with the hot gases supplied to the duct h from the mixing chamber j, by the suction produced by the fan d through the drum 3, during which time the drying operation is completed. At the discharge end of the drum 3 the gases pass into the annular space between the drums 2 and 3 and their heat is further utilised for the predrying stage above described. The finally dried crop passes into the collector 13, 16 and is delivered by the ducts 16 into the box or hopper 28, whence it is passed for example under the action of gravity to a bagging machine or other appliance.

If desired a fan may be provided to draw the dried crop into the bagging apparatus or to a grinding mill or the like.

What I claim and desire to secure by Letters Patent is:

1. A plant for drying green cut crops or the like comprising an inner drum and an outer drum, said drums being coaxially arranged and having a space therebetween, means at one end of said drums for supplying hot drying gas to said inner drum and to the space between said drums, means at the other end of said outer drum for feeding the crop to be dried into the space between said drums, means for rotating said inner drum, means attached to the outside of said inner drum for moving the crop fed into said space through said space from said last mentioned end of said drums to said first mentioned end to partially dry said crop, means for sucking a current of hot air through said inner drum and a plurality of radially disposed ducts positioned at said first mentioned end of said inner drum for feeding said partially dried crop from the space between said drums into that current of hot air to complete the drying of said crop.

2. A plant for drying green cut crops or the like comprising an inner drum and an outer drum, said drums being coaxially arranged and having a space therebetween, means at one end of said drums for supplying hot drying gas to said inner drum and to the space between said drums, means at the other end of said outer drum for feeding the crop to be dried into the space between said drums, means for rotating said inner drum, means attached to the outside of said inner drum for moving the crop fed into said space through said space from said last mentioned end of said drums to said first mentioned end to partially dry said crop, means for sucking a current of hot air through said inner drum, a plurality of ducts attached to said first mentioned end of said inner drum for feeding said partially dried crop into said inner drum and a baffle plate system mounted in said inner drum to deflect said partially dried crop delivered through said ducts into that current of hot air to complete the drying of said crop.

3. A plant for drying green cut crops or the like comprising an inner drum and an outer drum, said drums being coaxially arranged and having a space therebetween, means at one end of said drums for supplying hot drying gas to said inner drum and to the space between said drums, means at the other end of said outer drum for feeding the crop to be dried into the space between said drums, means for rotating said inner drum, means attached to the outside of said inner drum for moving the crop fed into said space through said space from said last mentioned end of said drums to said first mentioned end to partially dry said crop, means for sucking a current of hot air through said inner drum, said last mentioned means comprising a fan having a housing with the inlet thereof connnected to said space for drawing air therethrough and a plurality of ducts attached to said first mentioned end of said inner drum for feeding said partially dried crop into that current of hot air to complete the drying of said crop.

4. A plant for drying green cut crops or the like comprising an inner drum and an outer drum, said drums being coaxially arranged and having a space therebetween, means at one end of said drums for supplying hot drying gas to said inner drum and to the space between said drums, means at the other end of said outer drum for feeding the crop to be dried into the space between said drums, means for rotating said inner drum, means attached to the outside of said inner drum for moving the crop fed into said space through said space from said last mentioned end of said drums to said first mentioned end to partially dry said crop, means for sucking a current of hot air through said inner drum, said last mentioned means comprising a fan having a housing with the inlet thereof connected to said space for drawing air therethrough, a plurality of ducts attached to said first mentioned end of said inner drum for feeding said partially dried crop into said inner drum and a baffle plate system mounted in said inner drum to deflect said partially dried crop delivered through said ducts into that current of hot air to complete the drying of said crop.

5. A plant for drying green cut crops or the like comprising an inner drum and an outer drum, said drums being coaxially arranged and having a space therebetween, means at one end of said drums for supplying hot drying gas to said inner drum and to the space between said drums, means at the other end of said outer drum for feeding the crop to be dried into the space between said drums, means for rotating said inner drum, means attached to the outside of said inner drum for moving the crop fed into said space through said space from said last mentioned end of said drums to said first mentioned end to partially dry said crop, means for sucking a current of hot air through said inner drum, means for feeding said partially dried crop into that current of hot air to complete the drying of said crop and a plurality of ducts attached to the second mentioned end of said inner drum for receiving the dried crop from said inner drum and for discharging said dried crop.

6. A plant for drying green cut crops or the like comprising an inner drum and an outer drum, said drums being coaxially arranged and having a space therebetween, means at one end of said drums for supplying hot drying gas to said inner drum and to the space between said drums, means at the other end of said outer drum for feeding the crop to be dried into the space between said drums, means for rotating said inner drum, means attached to the outside of said inner drum for moving the crop fed into said space through said space from said last mentioned end of said drums to said first mentioned end to partially dry said crop, means for sucking a current of hot air through said inner drum, said last mentioned means comprising a fan having a housing with the inlet thereof connected to said space for drawing air therethrough, means connected to said inner drum for feeding said partially dried crop into that current of hot air to complete the drying of said crop and a plurality of ducts attached to the second mentioned end of said inner drum for receiving the dried crop from said inner drum and for discharging said dried crop.

EDGAR WILFRED BORROW.

REFERENCES CITED

The following references are of record in the file of this patent:

UNITED STATES PATENTS

| Number | Name | Date |
|---|---|---|
| 1,037,479 | Hein | Sept. 3, 1912 |
| 1,039,385 | Greene | Sept. 24, 1912 |
| 1,378,407 | Fraser | May 17, 1921 |
| 1,771,141 | Renneburg | July 22, 1930 |
| 1,871,934 | West et al. | Aug. 16, 1932 |
| 2,038,008 | Shodron | Apr. 21, 1936 |
| 2,309,810 | West | Feb. 2, 1943 |